(12) United States Patent
Dubois et al.

(10) Patent No.: US 12,173,797 B2
(45) Date of Patent: Dec. 24, 2024

(54) ANTI-THERMAL SHRINKAGE SUPPORT RING FOR A DYNAMIC RADIAL SEAL

(71) Applicant: SAINT-GOBAIN PERFORMANCE PLASTICS CORPORATION, Solon, OH (US)

(72) Inventors: Herman M. Dubois, Duffel (BE); Michael D. Downes, Kirkland, WA (US); Colby Stark, Costa Mesa, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 284 days.

(21) Appl. No.: 17/443,132

(22) Filed: Jul. 21, 2021

(65) Prior Publication Data

US 2022/0025973 A1 Jan. 27, 2022

Related U.S. Application Data

(60) Provisional application No. 63/054,876, filed on Jul. 22, 2020.

(51) Int. Cl.
*F16J 15/32* (2016.01)
*F16J 15/3204* (2016.01)
*F16J 15/3284* (2016.01)

(52) U.S. Cl.
CPC ....... *F16J 15/3204* (2013.01); *F16J 15/3284* (2013.01)

(58) Field of Classification Search
CPC .......................... F16J 15/3204; F16J 15/3284
See application file for complete search history.

(56) References Cited

U.S. PATENT DOCUMENTS

| 3,630,531 | A | 12/1971 | Bondi |
| 4,208,057 | A | 6/1980 | Messenger |
| 5,577,472 | A | 11/1996 | Banta, III et al. |
| 5,799,953 | A | 9/1998 | Henderson |
| 5,984,316 | A | 11/1999 | Balsells |
| 6,419,236 | B1 * | 7/2002 | Janian ................ F16J 15/3212 277/553 |
| 9,803,752 | B2 | 10/2017 | Castleman et al. |
| 9,909,636 | B2 * | 3/2018 | Kompa ................ H01R 13/187 |

(Continued)

FOREIGN PATENT DOCUMENTS

| JP | 2013253675 A | 12/2013 |
| JP | 2015001230 A | 1/2015 |

*Primary Examiner* — Vishal A Patel
(74) *Attorney, Agent, or Firm* — Abel Schillinger, LLP; Ann Palma

(57) ABSTRACT

Systems and methods include providing a seal for an assembly. The seal includes a jacket having a base, an inner sealing leg, and an outer sealing leg, and further includes a spring disposed within the jacket between and in contact with the inner sealing leg and the outer sealing leg. The spring includes an annular support ring disposed within the spring. The support ring biases an outer diameter (OD) of the spring towards the outer sealing leg of the jacket to maintain contact pressure between the inner sealing leg of the jacket and the shaft of the assembly. The support ring controls thermal shrinkage of the spring and the outer sealing leg to maintain a seal between a housing and a shaft of the assembly when the assembly is operated at cryogenic temperatures.

16 Claims, 5 Drawing Sheets

(56) References Cited

U.S. PATENT DOCUMENTS

| | | |
|---|---|---|
| 10,151,148 B2 | 12/2018 | Curry et al. |
| 11,353,079 B2 * | 6/2022 | Whitford .................. F16F 3/02 |
| 2001/0020770 A1 | 9/2001 | Dietle et al. |
| 2016/0047473 A1 * | 2/2016 | Foster ....................... F16F 3/12 |
| | | 267/1.5 |
| 2019/0107166 A1 * | 4/2019 | Whitford ................ F16F 1/045 |

* cited by examiner

ANTI-THERMAL SHRINKAGE SUPPORT RING FOR A DYNAMIC RADIAL SEAL

CROSS-REFERENCE TO RELATED APPLICATIONS

This application claims priority under 35 U.S.C. § 119(e) to U.S. Provisional Application No. 63/054,876, filed on Jul. 22, 2020, by Herman M. DUBOIS et al., entitled "ANTI-THERMAL SHRINKAGE SUPPORT RING FOR A DYNAMIC RADIAL SEAL," the disclosure of which is assigned to the current assignee hereof and incorporated herein by reference in its entirety for all purposes.

BACKGROUND OF THE INVENTION

Seals are used in many industrial applications to prevent leakage between components of an assembly. In some applications, these seals may be subjected to extreme operating conditions, such as cryogenic temperatures and/or high temperatures, which may cause portions of the seal or the components of the assembly to shrink, expand, or deform, thereby reducing the contact pressure between the seal and the components. The reduction in contact pressure at these extreme operating conditions may result in leakage between the seal and one or more of the components. Seals subjected to such extreme operating conditions therefore require higher reliability to properly maintain its sealing function. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
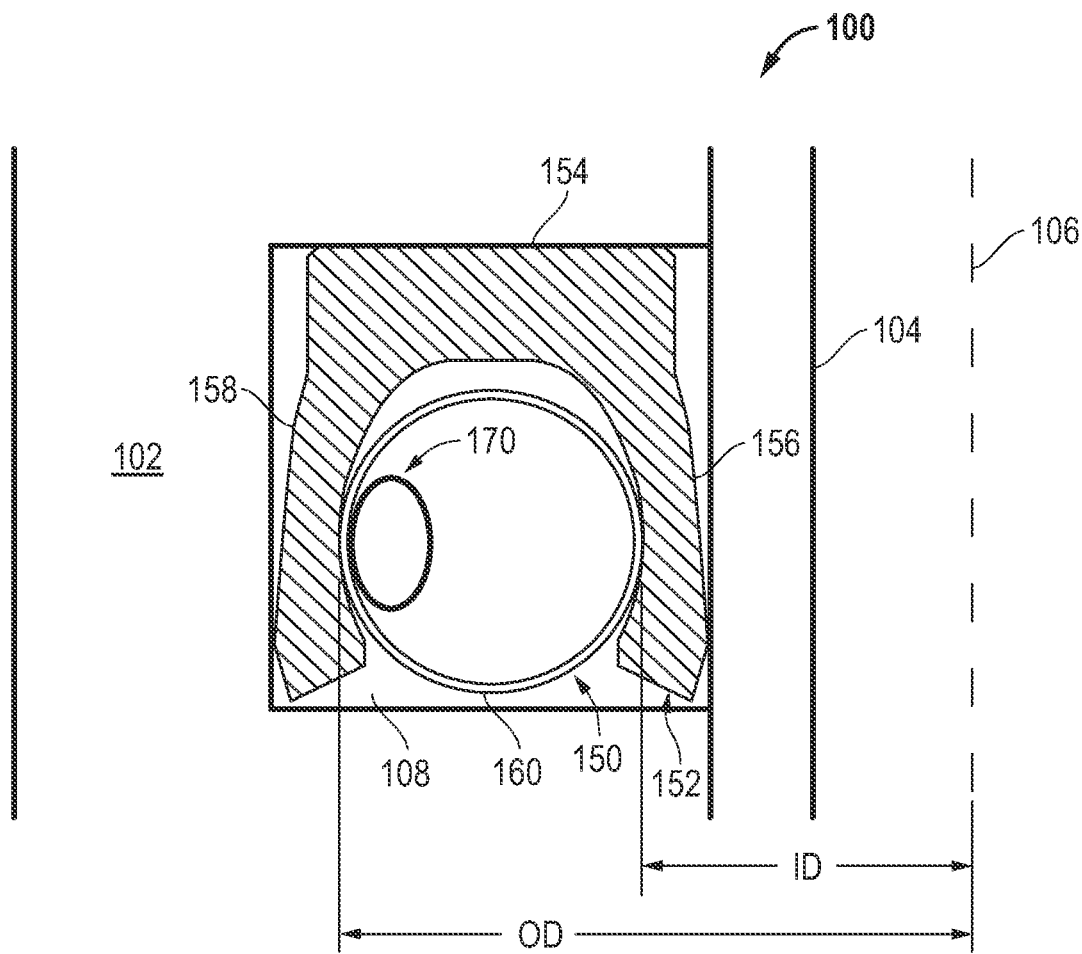
FIG. 1 is a cross-sectional view of an assembly having an annular seal according to an embodiment of the disclosure.

FIG. 1 shows a partial cross-sectional view of an assembly 100 according to an embodiment of the disclosure. In some embodiments, the assembly 100 may be a coupling assembly, solenoid assembly, or valve assembly. In more specific embodiments, the assembly 100 may be an aerospace, alternative energy, medical, or subsea coupling, solenoid, or valve. The assembly 100 may generally comprise a housing 102 and a shaft 104 that rotates or reciprocates within the housing about or along an axis 106. In some embodiments, the shaft 104 may comprise a hollow shaft. However, in other embodiments, the shaft 104 may comprise a solid shaft. The assembly 100 may further comprise a cavity 108 formed within the housing 102 and between the housing 102 and the shaft 104. In some embodiments, the housing 102 may comprise one or more additional components that collectively form the housing 102. For example, in some embodiments, an additional component may be selectively removable from the housing 102 to allow access to the cavity 108 to allow for installation and/or removal of an annular seal 150 disposed within the cavity 108.

The annular seal 150 may generally be disposed within the cavity 108 and about the shaft 104 and/or axis 106. The seal 150 may be configured to contact and provide a radial seal between the housing 102 and the shaft 104 of the assembly 100. The seal 150 may comprise a jacket 152, an annular energizing element or spring 160, and a support ring 170 disposed annularly within the spring 160. The jacket 152 may comprise a heel or base 154 adjacent to and in contact with a portion of the housing 102. The jacket 152 may also comprise an inner sealing leg 156 extending from the base 154 and adjacent to and in contact with the shaft 104 and an outer sealing leg 158 extending from the base 154 and adjacent to and in contact with the housing 102. However, in other embodiments, the jacket 152 may comprise additional features and/or profiles. The jacket 152 may generally be formed from a thermoset, thermoplastic, or a combination thereof. More specifically, the jacket 152 may be formed from PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, either with or without reinforcing additives or fillers.

In some embodiments, the spring 160 may comprise a circular metallic annular body having an inner diameter (ID) and an outer diameter (OD) as measured from the axis 106 of the shaft 104. In some embodiments, the ID of the spring 160 may be at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, at least 400 mm, at least 500 mm, or even greater. In some embodiments, the OD of the spring 160 may be at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, at least 1000 mm, or even greater. In some embodiments, the spring 160 may comprise a non-circular metallic annular body having an outer diameter (OD). For example, in some embodiments, the spring 160 may comprise a C-shaped spring. Further, in some embodiments, the spring 160 may comprise a circular or non-circular coiled spring.

The spring 160 may be disposed within the jacket 152 between and in contact with the inner sealing leg 156 and the outer sealing leg 158 of the jacket 152. More specifically, the spring 160 may be disposed within the jacket 152 such that the inner diameter of the metallic annular body of the spring 160 is adjacent to and in contact with the inner sealing leg 156 of the jacket 152, and such that the outer diameter of the metallic annular body of the spring 160 is adjacent to and in contact with the outer sealing leg 158 of the jacket 152. In the embodiment shown, the spring 160 comprises a substantially circular cross-sectional profile or shape. However, in other embodiments, the spring 160 may comprise an elliptical, oval, or other shaped cross-sectional profile or shape. The spring 160 may generally be formed from a resilient metallic material. More specifically, the spring 160 may be formed from a nickel-chromium based alloy such as Inconel®, a nickel-based alloy, a cobalt-chrome-nickel-molybdenum alloy, a beryllium-copper alloy, nickel, titanium, tungsten, stainless steel, spring steel, steel, aluminum, zinc, copper, magnesium, tin, platinum, lead, iron, or bronze. In some embodiments, the spring 160 may comprise a coating, such as an aluminum chromium nitride (AlCrN) coating, a titanium aluminum nitride (TiAlN) coating, any other wear resistant metallic coating, or any combination thereof.

Figure 2:
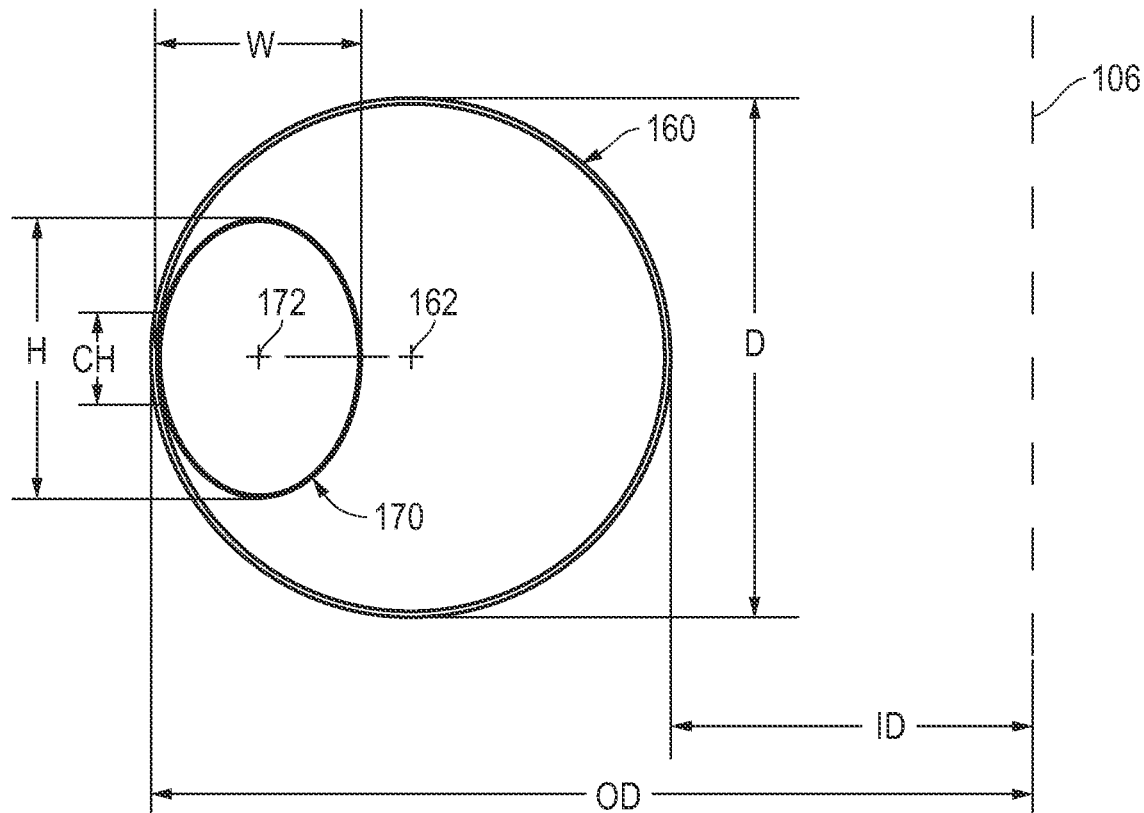
FIG. 2 is a cross-sectional view of a spring and a support ring of an annular seal according to an embodiment of the disclosure.

FIG. 2 shows a cross-sectional view of the spring 160 and the support ring 170 according to an embodiment of the disclosure. The support ring 170 may generally be disposed annularly within the spring 160. In some embodiments, the support ring 170 may be disposed adjacently to the OD of the spring 160. In some embodiments, the support ring 170 may be radially aligned with the center 162 of the spring 160. More specifically, in some embodiments, the support ring 170 may be axially positioned such that the center 172 of the support ring 170 may be radially aligned with the center 162 of the spring 160. Further, in some embodiments, the support ring 170 may be at least partially in contact with the spring 160. More specifically, in some embodiments, an outer surface of the support ring 170 may be at least partially in contact with an inner surface of the spring 160. Further, in some embodiments, the support ring 170 may be coupled to the spring 160. However, in some embodiments, the support ring 170 may be decoupled from the spring 160 or free to move, rotate, or translate independently from the spring 160.

In some embodiments, the outer surface of the support ring 170 may not be in contact with the inner surface of the spring 160 without compression. Accordingly, it will be appreciated the support provided by the support ring 170 to the spring 160 may be a function of cross-sectional shape and the spacing or tolerance between the inner surface of the spring 160 and the outer surface of the support ring 170. For example, in some embodiments, the tolerance between the inner surface of the spring 160 and the outer surface of the support ring 170 may be at least 0.05 millimeters (mm), at least 0.10 mm, at least 0.15 mm, at least 0.20 mm, at least 0.25 mm, at least 0.30 mm, at least 0.35 mm, at least 0.40 mm, at least 0.45 mm, at least 0.50 mm, or at least 0.75 mm. In some embodiments, the tolerance between the inner surface of the spring 160 and the outer surface of the support ring 170 may be not greater than 1 mm, not greater than 0.75 mm, not greater than 0.50 mm, not greater than 0.305 mm, not greater than 0.280 mm, not greater than 0.254 mm, not greater than 0.229 mm, not greater than 0.204 mm, or not greater than 0.20 mm. Further, it will be appreciated that the tolerance between the inner surface of the spring 160 and the outer surface of the support ring 170 may be between any of these minimum and maximum values, such as at least 0.05 mm to not greater than 1 mm, at least 0.20 mm to not greater than 0.305 mm, or at least 0.20 mm to not greater than 0.254 mm.

In some embodiments, at least a portion of the curvature of the support ring 170 may be complementary to the curvature of the spring 160. In some embodiments, the support ring 170 may comprise a contact height (CH) that represents the portion of the curvature of the support ring 170 that is in contact with the spring 160. In some embodiments, when in a free state and not installed in the assembly 100, the spring 160 and the support ring 170 may not be in contact. After installation into the cavity 108 of the assembly 100, however, once the spring 160 is compressed, the spring 160 and the support ring 170 may contact along the contact height (CH). In some embodiments, the support ring 170 may comprise a contact height (CH) that may be at least 1%, at least 2%, at least 3%, at least 4%, at least 5%, at least 10%, at least 15%, at least 20%, or at least 25% of the height (H) of the support ring 170. In some embodiments, the support ring 170 may comprise a contact height (CH) that may be not greater than 75%, not greater than 70%, not greater than 65%, not greater than 60%, not greater than 55%, not greater than 50%, not greater than 40%, or not greater than 30% of the height (H) of the support ring 170. Further, it will be appreciated that the support ring 170 may comprise a contact height (CH) that may be between any of these minimum and maximum values, such as at least 1% to not greater than 75% of the height (H) of the support ring 170, or even at least 5% to not greater than 30% of the height (H) of the support ring 170.

The support ring 170 may generally be axially positioned such that the center 172 of the support ring 170 may be radially aligned with the center 162 of the spring 160. In some embodiments, the height (H) and/or width (W) of the support ring 170 may comprise a relationship with the diameter (D) of the spring 160. In some embodiments, the relationship between the height (H) of the support ring 170 and the diameter (D) of the spring 160 may be configured to align the center 172 of the support ring 170 with the center 162 of the spring 160. In some embodiments, the height (H) of the support ring 170 may be at least 10%, at least 25%, at least 30%, at least 35%, at least 40%, at least 45%, at least 50%, at least 55%, or at least 60% of the diameter (D) of the spring 160. In some embodiments, the height (H) of the support ring 170 may be not greater than 95%, not greater than 90%, not greater than 85%, not greater than 80%, or not greater than 75% of the diameter (D) of the spring 160. Further, it will be appreciated that the height (H) of the support ring 170 may be between any of these minimum and maximum values, such as at least 10% to not greater than 95% of the diameter (D) of the spring 160, or even at least 50% to not greater than 80% of the diameter (D) of the spring 160.

In some embodiments, the relationship between the width (W) of the support ring 170 and the diameter (D) of the spring 160 may be configured to prevent contact between the support ring 170 and the ID of the spring 160 when the spring 160 is compressed radially inward. In some embodiments, the width (W) of the support ring 170 may be at least 10%, at least 15%, at least 20%, at least 25%, at least 30%, at least 35%, at least 40%, at least 45%, or at least 50% of the diameter (D) of the spring 160. In some embodiments, the width (W) of the support ring 170 may be not greater than 75%, not greater than 70%, not greater than 65%, not greater than 60%, not greater than 55%, or not greater than 50% of the diameter (D) of the spring 160. Further, it will be appreciated that the width (W) of the support ring 170 may be between any of these minimum and maximum values, such as at least 10% to not greater than 75% of the diameter (D) of the spring 160, or even at least 25% to not greater than 50% of the diameter (D) of the spring 160.

Figure 3:
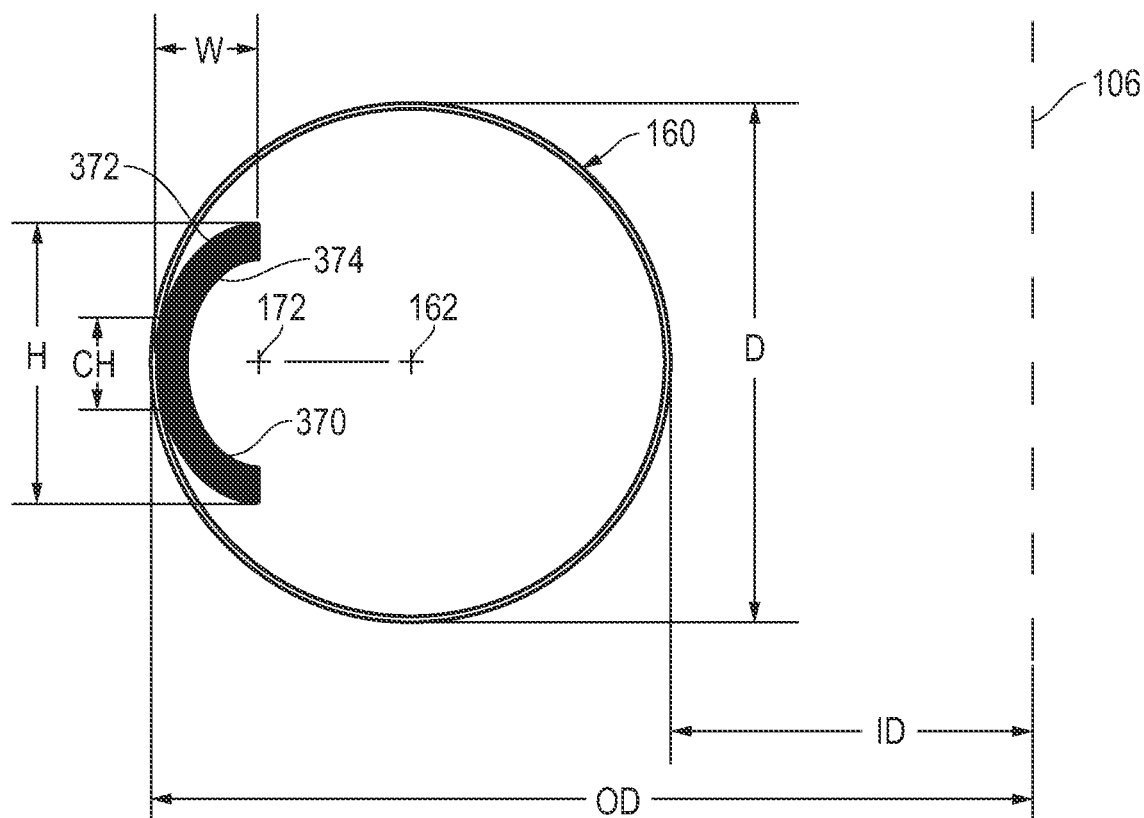
FIG. 3 is a cross-sectional view of a spring and a support ring of an annular seal according to an embodiment of the disclosure.

In some embodiments, the support ring 170 may comprise a cross-sectional profile that is elliptical, round, or oval. In other embodiments, the support ring 170 may comprise a C-ring cross-sectional profile such as the support ring 370 as shown in FIG. 3, a complex cross-sectional profile having a convex outer cross-sectional profile and concave inner cross-sectional profile such as the support ring 470 shown in FIG. 4, a hexagonal cross-sectional profile, a diamond cross-sectional profile, and/or a cross-sectional profile that makes multiple points of contact with the inner surface of the spring 160 such as the support ring 470 shown in FIG. 4.

In some embodiments, it will be appreciated that the height (H) and the width (W) may be different. In a particular embodiment, the height (H) may be larger than the width (W). In some embodiments, the support ring 170 may comprise a cross-sectional profile that is round. In such embodiments, it will be appreciated that the height (H) and the width (W) may be substantially similar. In some embodiments, the support ring 170 may be solid. However, in other embodiments, the support ring 170 may be hollow. Further, in some embodiments, the shape of the support ring 170 may be asymmetric, such that the support ring 170 comprises a convex, outwardly curved shape or surface at an outer diameter of the support ring 170 and/or the OD of the spring 160, while having a concave, convex, or flat shape or surface at an inner diameter of the support ring 170 and/or the ID of the spring 160. In some embodiment, the support ring 170 may also comprise a split-ring configuration such that the support ring 170 is at least partially split circumferentially and configured to collapse to a smaller diameter under load.

In some embodiments, the support ring 170 may be formed from a polymeric material. In such embodiments, the polymeric material may comprise PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, either with or without reinforcing additives or fillers. In some embodiments, the support ring 170 may be formed from a metallic material. In such embodiments, the metallic material may comprise a nickel-chromium based alloy such as Inconel®, a nickel-based alloy, a cobalt-chrome-nickel-molybdenum alloy, a beryllium-copper alloy, nickel, titanium, tungsten, stainless steel, spring steel, steel, aluminum, zinc, copper, magnesium, tin, platinum, lead, iron, or bronze. Further, in some embodiments, the support ring 170 may also comprise a coating, such as an aluminum chromium nitride (AlCrN) coating, a titanium aluminum nitride (TiAlN) coating, any other wear resistant metallic coating, or any combination thereof.

The support ring 170 may generally be configured to bias the outer diameter (OD) of the spring 160 towards the outer sealing leg 158 of the jacket 152 to maintain contact pressure between the outer sealing leg 158 of the jacket and the housing 102 and/or between the inner sealing leg 156 of the jacket 152 and the shaft 104 of the assembly 100. The support ring may also be configured to control thermal shrinkage (or thermal resizing in the case of high temperatures) of the spring 160 the outer sealing leg 158, or a combination thereof to maintain a seal between the housing 102 and the shaft 104 of the assembly 100 when the assembly 100 is operated at cryogenic temperatures. It will be appreciated that in some embodiments, the biasing effect of the support ring 170 on the spring 160 may be achieved only after installation of the seal 150 within the cavity 108 of the assembly 100.

FIG. 3 shows a cross-sectional view of a spring 160 and a support ring 370 according to an embodiment of the disclosure. In some embodiments, the support ring 370 may be similar to support ring 170 and be suitable for use in the annular seal 150. The support ring 370 may generally comprise a C-ring cross-sectional profile having a convex outer surface 372 at an outer diameter of the support ring 170 and/or the OD of the spring 160 and concave inner surface 374 at an inner diameter of the support ring 170 and/or the ID of the spring 160.

Figure 4:
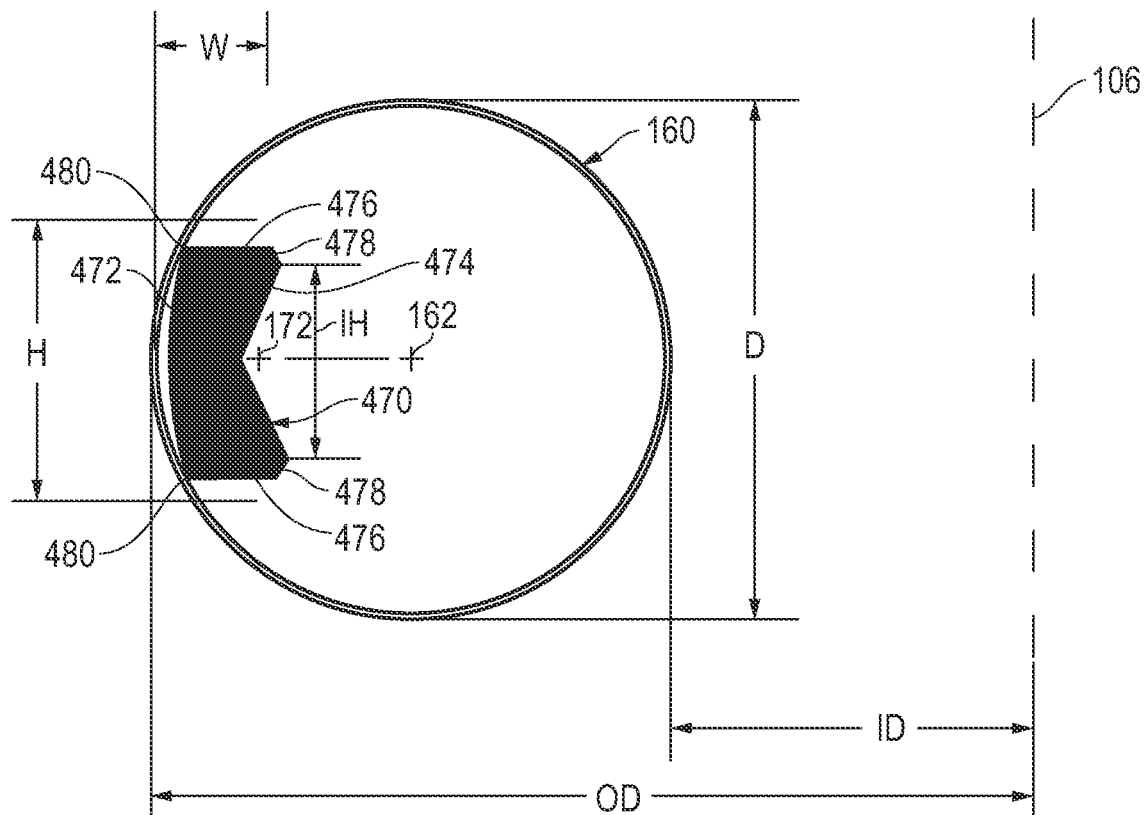
FIG. 4 is a cross-sectional view of a spring and a support ring of an annular seal according to an embodiment of the disclosure.

FIG. 4 is a cross-sectional view of a spring 160 and a support ring 470 according to an embodiment of the disclosure. In some embodiments, the support ring 470 may be similar to support ring 170 and be suitable for use in the annular seal 150. The support ring 470 may comprise an outer surface 472 at an outer diameter of the support ring 170 and/or the OD of the spring 160. In some embodiments, the outer surface 472 may be outwardly protruding. In some embodiments, the outwardly protruding surface 472 may be convex. In some embodiments, the outwardly protruding surface 472 may be formed by multiple flat sections (e.g., 3 sections, 4 sections, 5 sections). In other embodiments, the outer surface 472 may be substantially flat. In yet other embodiments, the outer surface 472 may be inwardly protruding. In some embodiments, the inwardly protruding surface 472 may be convex. In some embodiments, the inwardly protruding surface 472 may be formed by multiple flat sections (e.g., 3 sections, 4 sections, 5 sections). The support ring 470 may comprise a concave and/or angled inner surface 474 at an inner diameter of the support ring 170 and/or the ID of the spring 160. In some embodiments, the support ring 470 may comprise top and bottom surfaces 476 extending from the outer surface 472. In some embodiments, the support ring 470 may also comprise angled transition surfaces 478 disposed between each of the top and bottom surfaces 476 and the each angled surface of the concave angled inner surface 474.

Further, in some embodiments, the support ring 470 may comprise a cross-sectional profile that makes multiple points of contact 480 with the inner surface of the spring 160. As such, it will be appreciated the outer surface 472 of the support ring 470 may comprise a larger radius than the spring 160. Additionally, under no compression, the outer surface 472 of the support ring 470 may not be in contact with the inner surface of the spring 160. This may occur under no compression or under less than full compression. Accordingly, it will be appreciated that the contact height (CH) of the support ring 470 may comprise 100% of the outer surface 472 of the support ring 470 during full compression.

Figure 5:
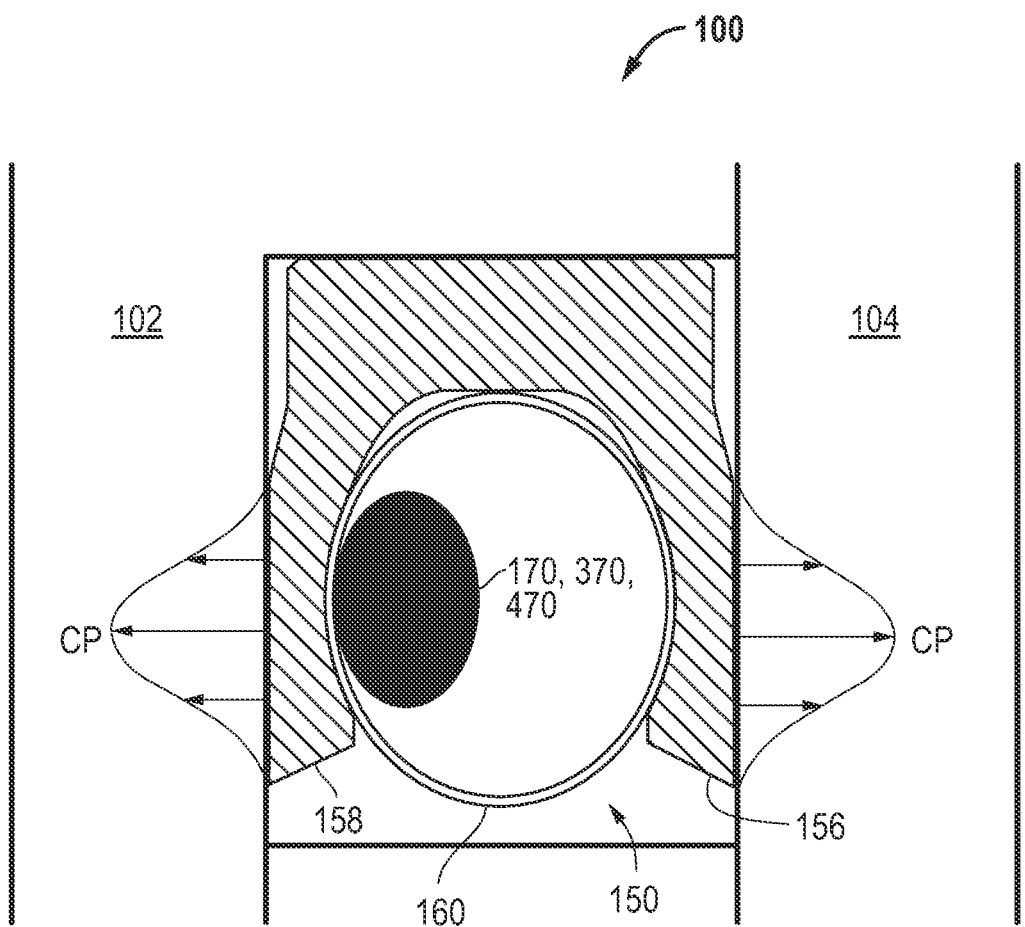
FIG. 5 is a cross-sectional view of an assembly having an annular seal according to an embodiment of the disclosure and showing the contact pressure (CP) distribution across the annular seal.

FIG. 5 is a cross-sectional view of an assembly 100 having an annular seal 150 according to an embodiment of the disclosure and showing the contact pressure (CP) distribution across the annular seal 150. As shown, the annular seal 150 may comprise a spring 160 and a support ring 170, 370, 470. When traditional seals are exposed to decreasing temperatures, the jacket may shrink radially inward at a greater rate than the housing 102, the shaft 104, and the energizing spring. The shrinkage of the inner sealing leg may be restricted by the shaft, thereby applying an increasingly high contact force on the shaft 104 with decreasing temperatures. The spring may not sufficiently restrict the shrinkage resulting in radially inward compression of the spring, which may cause the outer sealing leg of the jacket to lose contact with the housing 102, thereby resulting in leakage around the traditional seal. Further, in traditional seals, when the shaft 104 is rotating or reciprocating, the increasingly high contact force results in increased friction between the inner sealing leg of the jacket and the shaft 104, which may increase the wear rate of the inner sealing lip of the jacket and ultimately increase the leakage rate and/or decrease the time required for leakage to occur. The increasingly high contact force may also increase the power and/or torque requirements of the shaft 104. Alternatively, the traditional seal may expand when exposed to high temperature cycles and may take a thermal set when exposed to compression forces. Cooling the seal down to room temperature or even lower temperatures may result in potentially losing contact or lowering the contact pressure between the seal and the assembly 100. Friction on the shaft 104 may also increase in these instances due to the seal cooling down and becoming increasingly clamped tighter to the shaft 104.

Embodiments of the seal 150 comprise a support ring 170, 370, 470. The support ring 170, 370, 470 may bias the outer diameter (OD) of the spring 160 towards the outer sealing leg 158 of the jacket 152 to maintain contact pressure between the outer sealing leg 158 of the jacket and the housing 102, thereby reducing, restricting, and/or altogether preventing radial compression and/or shrinkage (or thermal resizing in the case of high temperatures) of the outer sealing leg 158 of the jacket 152. With this, sufficient contact force between the outer sealing leg 158 and the housing 102 may be maintained, and a reduced leakage rate achieved over traditional seals. Furthermore, since the spring 160 may no longer be relied upon to resist shrinkage of the outer sealing leg 158, a lower spring force can be employed in the spring 160 than in traditional seals. Accordingly, in some embodiments, the support ring 170, 370, 470 may serve to reduce the contact force on the shaft 104 and consequently reduce wear of the seal 150, reduce the power and/or torque requirements of the shaft 104, and/or improve sealing performance (such as reduce or altogether prevent leakage) over traditional seals not having a support ring 170, 370, 470.

In some embodiments, the support ring 170, 370, 470 may serve to maintain sufficient contact pressure (CP) between the outer sealing leg 158 of the jacket 152 and the housing 102 and between the inner sealing leg 156 of the jacket 152 and shaft 104. Accordingly, in some embodiments, the difference between the contact pressure (CP) of the seal 150 measured at the outer sealing leg 158 of the jacket 152 and the inner sealing leg 156 of the jacket 152 may be not greater than 500 MPa, not greater than 250 MPa, not greater than 100 MPa, not greater than 75 MPa, not greater than 50 MPa, not greater than 45 MPa, not greater than 40 MPa, not greater than 35 MPa, not greater than 30 MPa, not greater than 25 MPa, not greater than 20 MPa, not greater than 15 MPa, not greater than 10 MPa, not greater than 5 MPa, or not greater than 0.5 MPa.

Furthermore, it will be appreciated that the seal 150 may generally be suitable for use in a multitude of applications. Exemplary applications include space applications such as single and multi-stage launch vehicles, lunar and interplanetary fueling stations, and lunar and planetary landers. Other exemplary applications include oil and gas applications such as extraction and processing equipment, cryogenic alternative energy applications, industrial applications, or medical applications.

Embodiments of an assembly 100 and/or a seal 150 may include one or more of the following:

Embodiment 1. A seal, comprising: a jacket having a base, an inner sealing leg, and an outer sealing leg; and a spring disposed within the jacket between and in contact with the inner sealing leg and the outer sealing leg, the spring comprising: an annular support ring disposed annularly within the spring.

Embodiment 2. An assembly, comprising: a shaft having an axis; a housing comprising a cavity and disposed annularly about the shaft; and a seal disposed within the cavity and configured to provide a radial seal between the shaft and the housing, the seal comprising: a jacket having a base, an inner sealing leg adjacent to and in contact with the shaft, and an outer sealing leg adjacent to and in contact with the housing; and a spring disposed within the jacket between and in contact with the inner sealing leg and the outer sealing leg, the spring comprising: an annular support ring disposed annularly within the spring.

Embodiment 3. The seal or the assembly of any of embodiments 1 to 2, wherein the spring comprises an inner diameter and an outer diameter.

Embodiment 4. The seal or the assembly of embodiment 3, wherein the inner diameter of the spring is disposed adjacently to and in contact with the inner sealing leg of the jacket, and wherein the outer diameter of the spring is disposed adjacently to and in contact with the outer sealing leg of the jacket.

Embodiment 5. The seal or the assembly of any of embodiments 1 to 4, wherein the support ring comprises a cross-sectional profile that is elliptical, oval, or round.

Embodiment 6. The seal or the assembly of any of embodiments 1 to 5, wherein the support ring is solid.

Embodiment 7. The seal or the assembly of any of embodiments 1 to 6, wherein the support ring is hollow.

Embodiment 8. The seal or the assembly of any of embodiments 3 to 7, wherein the support ring is disposed adjacently to the outer diameter of the spring.

Embodiment 9. The seal or the assembly of any of embodiments 1 to 8, wherein the support ring is axially positioned such that a center of the support ring is radially aligned with a center of the spring.

Embodiment 10. The seal or the assembly of any of embodiments 1 to 9, wherein the support ring is in contact with the spring.

Embodiment 11. The seal or the assembly of embodiment 10, wherein an outer surface of the support ring is at least partially in contact with an inner surface of the spring.

Embodiment 12. The seal or the assembly of any of embodiments 1 to 11, wherein the support ring is decoupled from the spring.

Embodiment 13. The seal or the assembly of any of embodiments 1 to 12, wherein at least a portion of a curvature of the support ring is complementary to a curvature of the outer diameter of the spring.

Embodiment 14. The seal or the assembly of embodiment 13, wherein the support ring is symmetric.

Embodiment 15. The seal or the assembly of embodiment 13, wherein the support ring is asymmetric, and wherein an inner diameter of the support ring comprises a convex, a concave, or a substantially flat shape.

Embodiment 16. The seal or the assembly of any of embodiments 13 to 15, wherein the support ring comprises a contact height (CH) that is at least 1%, at least 2%, at least 3%, at least 4%, at least 5%, at least 10%, at least 15%, at least 20%, or at least 25% of the total height (H) of the support ring.

Embodiment 17. The seal or the assembly of embodiment 16, wherein the support ring comprises a contact height (CH) that is not greater than 75%, not greater than 70%, not greater than 65%, not greater than 60%, not greater than 55%, not greater than 50%, not greater than 40%, or not greater than 30% of the total height (H) of the support ring.

Embodiment 18. The seal or assembly of any of embodiments 1 to 17, wherein the height (H) of the support ring is configured to align the center of the support ring with the center of the spring.

Embodiment 19. The seal or assembly of embodiment 18, wherein the height (H) of the support ring is at least 25%, at least 30%, at least 35%, at least 40%, at least 45%, at least 50%, at least 55%, or at least 60% of the diameter (D) of the spring.

Embodiment 20. The seal or assembly of embodiment 19, wherein the height (H) of the support ring is not greater than 95%, not greater than 90%, not greater than 85%, not greater than 80%, or not greater than 75% of the diameter (D) of the spring.

Embodiment 21. The seal or assembly of any of embodiments 1 to 20, wherein the width (D) of the support ring is configured to prevent contact between the support ring and the ID of the spring when the spring is compressed radially inward.

Embodiment 22. The seal or assembly of embodiment 21, wherein the width (W) of the support ring is at least 10%, at least 15%, at least 20%, at least 25%, at least 30%, at least 35%, at least 40%, at least 45%, or at least 50% of the diameter (D) of the spring.

Embodiment 23. The seal or assembly of embodiment 22, wherein the width (W) of the support ring is not greater than 75%, not greater than 70%, not greater than 65%, not greater than 60%, not greater than 55%, or not greater than 50% of the diameter (D) of the spring.

Embodiment 24. The seal or assembly of any of embodiments 1 to 23, wherein the support ring is configured to bias an outer diameter (OD) of the spring towards the outer sealing leg of the jacket to maintain contact pressure between the outer sealing leg of the jacket and the housing of the assembly.

Embodiment 25. The seal or assembly of any of embodiments 1 to 24, wherein the support ring is configured to control thermal shrinkage or thermal resizing of the spring, the outer sealing leg, or a combination thereof at the outer diameter of the spring to maintain a seal between the housing and the shaft of the assembly when the assembly is operated at cryogenic temperatures.

Embodiment 26. The seal or assembly of any of embodiments 1 to 25, wherein the jacket is formed from PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, and with or without reinforcing additives or fillers.

Embodiment 27. The seal or assembly of any of embodiments 1 to 26, wherein the spring is formed from a nickel-chromium based alloy such as Inconel®, a nickel-based alloy, a cobalt-chrome-nickel-molybdenum alloy, a beryllium-copper alloy, nickel, titanium, tungsten, stainless steel, spring steel, steel, aluminum, zinc, copper, magnesium, tin, platinum, lead, iron, or bronze.

Embodiment 28. The seal or assembly of any of embodiments 1 to 27, wherein the support ring is formed from a polymeric material.

Embodiment 29. The seal or assembly of embodiment 28, wherein the polymeric material comprises PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, and with or without reinforcing additives or fillers.

Embodiment 30. The seal or assembly of any of embodiments 1 to 27, wherein the support ring is formed from a metallic material.

Embodiment 31. The seal or assembly of embodiment 30, wherein the metallic material comprises a nickel-chromium based alloy such as Inconel®, a nickel-based alloy, a cobalt-chrome-nickel-molybdenum alloy, a beryllium-copper alloy, nickel, titanium, tungsten, stainless steel, spring steel, steel, aluminum, zinc, copper, magnesium, tin, platinum, lead, iron, or bronze.

Embodiment 32. The seal or assembly of any of embodiments 1 to 31, wherein the inner diameter (ID) of the spring is at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, at least 400 mm, at least 500 mm, or even greater.

Embodiment 33. The seal or assembly of any of embodiments 1 to 32, wherein the outer diameter (OD) of the spring is at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, at least 1000 mm, or even greater.

Embodiment 34. The seal or assembly of any of embodiments 1 to 33, wherein a difference between the contact pressure of the seal measured at the outer sealing leg of the jacket and the inner sealing leg of the jacket is not greater than 500 MPa, not greater than 250 MPa, not greater than 100 MPa, not greater than 75 MPa, not greater than 50 MPa, not greater than 45 MPa, not greater than 40 MPa, not greater than 35 MPa, not greater than 30 MPa, not greater than 25 MPa, not greater than 20 MPa, not greater than 15 MPa, not greater than 10 MPa, not greater than 5 MPa, or not greater than 0.5 MPa.

Embodiment 35. The seal or assembly of any of embodiments 1 to 34, wherein the seal is suitable for use in at least one of a space application comprising a single or multi-stage launch vehicle, a lunar or interplanetary fueling station, or a lunar or planetary lander, an oil and gas application comprising extraction equipment or processing equipment, a cryogenic alternative energy application, an industrial application, and a medical application.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), or both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal, comprising:
   a jacket having a base, an inner sealing leg, and an outer sealing leg; and
   a spring disposed within the jacket between and in contact with the inner sealing leg and the outer sealing leg, the spring comprising:
   a solid annular support ring disposed annularly within the spring, wherein the support ring comprises an elliptical cross-sectional profile, an oval cross-sectional profile, a C-ring cross-sectional profile, a substantially heptagonal cross-sectional profile having a convex outer edge, a substantially hexagonal cross-sectional profile, or a diamond cross-sectional profile, wherein the height (H) of the support ring is at least 10% and not greater than 80% of the diameter (D) of the spring, and wherein the width (W) of the support ring is at least 10% and not greater than 60% of the diameter (D) of the spring, wherein the support ring is in contact with the spring.

2. The seal of claim 1, wherein the support ring is disposed adjacently to an outer diameter of the spring.

3. The seal of claim 1, wherein the support ring comprises multiple points of contact with the spring.

4. The seal of claim 1, wherein the support ring comprises a cross-sectional profile having an outwardly protruding outer surface.

5. The seal of claim 1, wherein the support ring comprises a cross-sectional profile having a flat outer surface.

6. The seal of claim 1, wherein the support ring comprises a cross-sectional profile having a convex outer surface.

7. The seal of claim 1, wherein the support ring comprises a cross-sectional profile that is symmetric.

8. The seal of claim 1, wherein the support ring comprises a cross-sectional profile that is asymmetric.

9. The seal of claim 1, wherein the height (H) of the support ring is configured to align the center of the support ring with the center of the spring.

10. The seal of claim 1, wherein the width (D) of the support ring is configured to prevent contact between the support ring and the ID of the spring when the spring is compressed radially inward.

11. The seal of claim 1, wherein the support ring is configured to bias an outer diameter (OD) of the spring towards the outer sealing leg of the jacket to maintain contact pressure between the outer sealing leg of the jacket and a housing of an assembly.

12. The seal of claim 11, wherein the support ring is configured to control thermal shrinkage or thermal resizing of the spring, the outer sealing leg, or a combination thereof at the outer diameter of the spring to maintain a seal between the housing and a shaft of the assembly when the assembly is operated at cryogenic temperatures.

13. The seal of claim 1, wherein the jacket is formed from PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, and with or without reinforcing additives or fillers.

14. The seal of claim 1, wherein the spring is formed from a nickel-chromium based alloy, a nickel-based alloy, a cobalt-chrome-nickel-molybdenum alloy, nickel, titanium, tungsten, stainless steel, spring steel, steel, aluminum, zinc, copper, magnesium, tin, platinum, lead, iron, or bronze.

15. The seal of claim 1, wherein the support ring is formed from a polymeric material comprising PTFE, a fluoropolymer, a perfluoropolymer, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PI, PEI, or TPI, or any combination thereof, and with or without reinforcing additives or fillers.

16. The seal of claim 1, wherein the support ring is formed from a metallic material comprising a nickel-chromium based alloy, a nickel-based alloy, a cobalt-chrome-nickel-molybdenum alloy, a beryllium-copper alloy, nickel, titanium, tungsten, stainless steel, spring steel, steel, aluminum, zinc, copper, magnesium, tin, platinum, lead, iron, or bronze.

* * * * *